(12) United States Patent
Le

(10) Patent No.: US 6,780,990 B1
(45) Date of Patent: Aug. 24, 2004

(54) HYDROGENATED STARCH HYDROLYSATE

(75) Inventor: Anh Si Le, Newark, DE (US)

(73) Assignee: SPI Polyols, Inc., New Castle, DE (US)

( * ) Notice: Subject to any disclaimer, the term of this patent is extended or adjusted under 35 U.S.C. 154(b) by 268 days.

(21) Appl. No.: 09/702,210

(22) Filed: May 14, 2001

Related U.S. Application Data

(62) Division of application No. 09/276,014, filed on Mar. 25, 1999.
(60) Provisional application No. 60/079,468, filed on Mar. 26, 1998.

(51) Int. Cl.⁷ .................. C08B 31/00; C08B 30/12; A23L 1/09; C13K 1/06; A23G 3/30
(52) U.S. Cl. .................. 536/102; 536/103; 536/4.1; 536/123.13; 536/123.1; 127/29; 127/38; 426/660; 426/658; 426/103; 426/506
(58) Field of Search .................. 536/4.1, 102, 123.13, 536/123.1, 1.11, 103; 127/29, 38; 426/660, 658, 506, 103; 424/48

(56) References Cited

U.S. PATENT DOCUMENTS

| | | |
|---|---|---|
| 2,280,975 A | 4/1942 | Power |
| 3,876,794 A | 4/1975 | Rennhard |
| 3,890,300 A | 6/1975 | Huchette, et al. |
| 3,935,284 A | 1/1976 | Kruse |
| 3,963,788 A | 6/1976 | Kruse et al. |
| 4,248,895 A * | 2/1981 | Stroz et al. |
| 4,279,931 A | 7/1981 | Verwaerde et al. |
| 4,322,569 A | 3/1982 | Chao et al. |
| 4,346,116 A | 8/1982 | Verwaerde et al. |
| 4,445,938 A * | 5/1984 | Verwaerde et al. |
| 4,675,293 A | 6/1987 | Gibs |
| 4,680,180 A | 7/1987 | Bussiere et al. |
| 4,717,765 A | 1/1988 | Hirao et al. |
| 4,845,208 A | 7/1989 | Fuertes et al. |
| 4,985,553 A | 1/1991 | Fuertes et al. |
| 5,034,231 A | 7/1991 | Yatka et al. |
| 5,109,128 A | 4/1992 | Schumacher et al. |
| 5,314,701 A | 5/1994 | Mentink et al. |
| 5,385,749 A | 1/1995 | Serpelloni et al. |
| 5,436,329 A * | 7/1995 | Caboche |
| 5,493,014 A | 2/1996 | Caboche |
| 5,506,353 A | 4/1996 | Subramaniam |
| 5,601,863 A | 2/1997 | Borden et al. |
| 5,627,273 A | 5/1997 | Thomaides et al. |
| 5,629,042 A | 5/1997 | Serpelloni et al. |
| 5,641,477 A | 6/1997 | Syed et al. |
| 5,772,013 A | 6/1998 | Kunz et al. |
| 5,780,620 A | 7/1998 | Mandai et al. |
| 5,853,487 A | 12/1998 | Tang et al. |
| 6,380,379 B1 | 4/2002 | Antrim et al. |
| 6,391,293 B1 | 5/2002 | Barresi et al. |
| 6,593,469 B1 | 7/2003 | Barresi et al. |
| 6,610,672 B2 | 8/2003 | Barresi et al. |
| 6,613,898 B1 | 9/2003 | Barresi et al |

FOREIGN PATENT DOCUMENTS

| | | |
|---|---|---|
| EP | 0 548 399 B1 | 6/1993 |
| EP | 0 775 709 A1 | 5/1997 |
| EP | 0 142 725 B1 | 5/1998 |
| GB | 526 839 | 9/1940 |
| JP | 10028531 | 2/1998 |
| WO | WO-92/14761 | 9/1992 |
| WO | WO-92/18542 | 10/1992 |
| WO | WO-95/07303 | 3/1995 |
| WO | WO-97/29133 | 8/1997 |
| WO | WO-97/34861 | 9/1997 |

OTHER PUBLICATIONS

Patent Abstracts of Japan, Vol. 16, No. 431 (C–938), Sep. 9, 1992 and JP 04 148661A (Nippon Shokuhin Kako), May 21, 1992.

English language abstract of JP 10028531 (Feb. 3, 1998).

English language translation of pp. 2–7 of JP 10028531 (Feb. 3, 1998.)

The Production and Properties of Glucose Syrups, Kearsley, et al., Starch/Stärke 32, 1980, pp. 244–247.

Production and Physiocochemical Properties of Hydrogenated Glucose Syrups, Kearsley et al., "Die Stärke, "29, 1977, pp. 425–429.

Hydrogenated Starch Hydrolysates, P. Leroy, "Health and Sugar Substitutes," Proc. ERGOB Conf., Geneva 1978, pp. 114–119 (Karper, Basel 1978).

Glass Transition Explanation for the Effect of Polyhydroxy Compoounds on Protein Denaturation in Dehdrated Solids, Leonard N. Bell et al., "Journal of Food Service,"vol. 61, No. 2, 1996, pp. 372–374.

Stabilization of the Restriction Enzyme EcoRl Dried with Trehalose and other Selected Glass–Forming Solutes, Rossie, et al., "Biotechnol. Prog., "vol. 13, No. 5, 1997, pp. 609–616.

European Patent Office, Patent Abstracts of Japan, Pub. No. 04148661, May 21, 1992.

Derwent WPI; Abstract of JP 4148661 (May 21, 1992).

Schmidt et al., Acta Pharmaceutica Technologica (1998), 34(1), 22–6.

U.S. Provisional Application No. 60/160,602 filed Oct. 20, 1999, entitled Reduced Malto–Oligosaccharides Cleaning Composition (copy attached).

* cited by examiner

*Primary Examiner*—Samuel Barts
*Assistant Examiner*—Michael C. Henry
(74) *Attorney, Agent, or Firm*—Connolly Bove Lodge & Hutz, LLP

(57) ABSTRACT

A hydrogenated starch hydrolysate having the following saccharide contents (based on the solids content of the hydrogenated starch hydrolysate):

A.<8 wt.-% of hydrogenated monosaccharides (DP=1);

B.<41 wt.-% of hydrogenated disaccharides (DP=2);

C.<15 wt.-% of hydrogenated trisaccharides (DP=3);

D.<30 wt.-% of hydrogenated quat- to deca-oligosaccharides (DP=4 to 10); and

E. from about 14 to about 38 wt.-% of hydrogenated undeca- or greater polysaccharides (DP$\geq$11);

and hard boiled candies which are produced from the hydrogenated starch hydrolysate.

10 Claims, No Drawings

HYDROGENATED STARCH HYDROLYSATE

The present patent application is a divisional of U.S. patent application No. 09/276,014 filed on Mar. 25, 1999 in the name of Anh Si Le and claims the benefit of the filing date of Provisional Application No. 60/079,468 filed Mar. 26, 1998.

BACKGROUND OF THE INVENTION

1. Field of the Invention

The present invention relates to hydrogenated starch hydrolysate compositions.

2. Description of the Prior art

Polyols (polyalcohols), such as hydrogenated starch hydrolysates, maltitol, isomaltitol, maltotriitol, or combinations thereof, are commonly used as artificial sweeteners in food confectionary products, such as hard candies and chewing gum. These materials are highly hygroscopic which makes them essentially non-dehydratable by conventional methods. Product applications, however, are often dependent on the availability of a non-hygroscopic free-flowing powder. Various drying techniques have been attempted on the above-mentioned polyols, such as conventional spray-drying and freeze-drying. However, these drying techniques fail to produce a product that is stable to temperature and moisture. Spray drying techniques are unsatisfactory because of atomizer blockage and formation of glassy deposits. Other more sophisticated drying techniques, such as freeze-drying and foam-mat drying, are uneconomical.

Boiled sweets, commonly called hard sweets or hard boiled candies, are solid and essentially amorphous confectionary products. They are obtained by extensive dehydration of carbohydrate syrups. While the principal market for boiled sweets currently consists of sugar products prepared from non-hydrogenated carbohydrate syrups, there exists a substantial market for sugar-free or polyol-containing essentially amorphous boiled sweets, which are obtained using hydrogenated carbohydrate (e.g., saccharides) syrups. Sugarless boiled sweets are attractive to the consumer because they do not promote tooth decay and are less caloric than conventional sucrose-containing boiled sweets, while presenting similar organoleptic characteristics.

Generally, sugar-free hard boiled sweets are manufactured by boiling mixtures of polyols dissolved into water. Often, polyols in a powdered form are added to a maltitol syrup. Conventional powdered polyols include maltitol, mannitol, erythritol, and isomalt. Isomalt can also be used alone after dissolution into water. The mixtures of polyols are usually boiled at 150–200° C., under reduced pressure (e.g., about 16–25 inches of mercury), in order to evaporate most of the water (i.e., bring the water content of the mixture to a value which is normally less than 6.0%, and in some cases, less than 3.0% by weight water). The molten mass which is obtained is then cooled and cast or deposited into moulds or formed on rolls or by extrusion after the addition of various ingredients, such as flavorants, colorants, intense sweeteners, fillers, acids, plant extracts, vitamins, pharmaceutical active ingredients, and the like. After returning to room temperature, the products have a texture and an appearance similar to that of glass.

Sugar-free boiled sweets must be stable over time. They must have an adequate shelf-life which varies as little as possible from the time when they are manufactured up to the time when they are consumed, so as to provide products which are attractive and pleasant in the mouth. Sugar-free boiled sweets, unfortunately, are not stable products from a thermodynamic point of view. The extent of the instability depends essentially upon the composition and the conditions under which the sugarless boiled sweets are preserved. One of the most common major problems is that sugar-free boiled sweets may become sticky during storage. Once wrapped, the stickiness makes it difficult or impossible to remove the wrapping materials before they are consumed. In addition, the sugarless boiled sweets may become flowable and lose their shape.

This problematic variation towards a sticky and syrupy state can be explained by surface phenomena and depth phenomena. The origin of surface phenomena is in the hygroscopic nature of boiled sweets. It is known that boiled sweets, which are essentially anhydrous products, have very low equilibrium relative humidities, substantially lower than the ambient relative humidities commonly found under normal storage conditions. This explains why an uptake of water necessarily occurs at the surface of the sweets as soon as they are exposed to air. When this water uptake is sufficiently high, it tends to liquify the surface of the sweets, which takes on the characteristics of a syrup and makes them sticky. The higher the water content of the boiled sweets, the quicker this phenomena occurs.

The depth phenomena have a thermal origin. When a boiled sweet is exposed to a temperature that is above the glass transition temperature (Tg) of the boiled sweet, the boiled sweet will become deformable and can even melt. To avoid the negative aspects of the depth phenomena, it is generally preferred that the storage temperature is below the glass transition temperature (Tg) of the boiled sweet. This preference is known in the art and is discussed in an article entitled "La transition vitreuse: incidences en technologic alimentaire" [Glass transition: incidents in food technology] by M. Le Meste and D. Simalos, published in I.A.A. of January/February, 1990, which is hereby incorporated by reference. The glass transition temperature is the temperature at which, upon heating, a glassy and solid boiled sweet softens and eventually becomes a syrupy liquid. This temperature is normally measured by differential scanning calorimetry (DSC). However, it is also understood that a boiled sweet may be subject to a deformation, or even to a complete flow, when its storage temperature significantly exceeds its glass transition temperature. In such a case, the initially dry product becomes sticky. Furthermore, the higher the water content of the boiled sweet in question, the lower the glass transition temperature of the boiled sweet and the greater the risk of stickiness, deformation or flowing during the storage of the boiled sweet.

In order to avoid unstable boiled sweets becoming sticky products over time, it has been generally necessary to lower their content of water. While, recent advances in the art have provided somewhat stable sugar-free boiled sweets having greater than 3% water contents, there still exists a need to provide a sugarless sweet which is more stable to temperature and moisture.

U.S. Pat. No. 5,629,042 to Serpelloni et al., which is hereby incorporated by reference, discloses a sugarless boiled sweet containing a water crystallizable polyol and carbohydrates (e.g., saccharides). The boiled sweet has a water content greater than 3% and a glass transition temperature greater than or equal to 38° C., the glass transition temperature being measured at a water content of about 3.2%.

U.S. Pat. No. 4,248,895 to Stroz et al., which is hereby incorporated by reference, shows hydrogenated starch hydrolysates having total solids contents of about 72 to 80 wt.-%. Based on the dry hydrogenated starch hydrolysates, the total solids contents consist of about 4 to 20 wt.-% sorbitol (hydrogenated monosaccharide), 20 to 65 wt.-% hydrogenated dissaccharides (e.g., maltitol), 15 to 45 wt.-% tri- to hepta-hydrogenated oligosaccharides, and 10 to 35 wt.-% hydrogenated polysaccharides higher than hepta.

U.S. Pat. No. 4,445,938 to Verwaerde et al., which is hereby incorporated by reference, discloses dry hydrogenated starch hydrolysates consisting of, based on total solids content, less than 14 wt.-% of hydrogenated monosaccharides (e.g., sorbitol), less than 35 wt.-% of hydrogenated dissaccharides (e.g., maltitol), 12 to 18 wt.-% of hydrogenated trisaccharides, between 42 and 70 wt.-% of hydrogenated quat- to deca-oligosaccharides, and less than 32 wt.-% of hydrogenated polysaccharides greater than deca. The Verwaerde composition provides a more stable hydrogenated starch hydrolysate than one which has 15.5 or 30.0 wt.-% of hydrogenated quat- to deca-oligosaccharides.

When the hydrogenated starch hydrolysate syrups that are presently on the market (e.g., HYSTAR 3375 from Lonza and RA 1000 from Roquette) are used to produce hard boiled candies or sweets, the candies or sweets are relatively unstable at high storage temperatures and/or high water contents, which can result in a sticky candy or sweet as explained above. Accordingly, the present invention satisfies a long-felt need by providing a new hydrogenated starch hydrolysate which can be used to prepare hard boiled candies that are stable at high temperatures and high water contents and absorb little moisture in humid conditions. The various kinds of hydrogenated mono-, di-, oligo- and poly-saccharides are characterized by the degree of polymerization ("DP") after hydrogenation. Hydrogenated monosaccharides have a DP=1. Hydrogenated dissaccharides have a DP=2. Hydrogenated tri-, quat-, penta-, hexa-, hepta-, octa-, nona-, and deca-saccharides have DPs of 3, 4, 5, 6, 7, 8, 9 and 10, respectively. Hydrogenated undeca- and greater saccharides have DPs of 11 or greater. The DP may be determined by routine HPLC analysis.

Accordingly, it is an object of the present invention to provide a stable hydrogenated starch hydrolysate, which is generally in syrup form (i.e., an aqueous solution) but can be in the form of a dry powder (e.g., by spray drying the syrup).

It is a further object of the present invention to provide a hydrogenated starch hydrolysate syrup which can be used to prepare hard boiled candies that are stable at high temperatures and high water contents.

It is still another object of the present invention to provide a stable hydrogenated starch hydrolysate which can be used to prepare hard boiled candies that absorb little water under humid conditions.

It is yet a further object of the present invention to provide a stable hydrogenated starch hydrolysate syrup which can be used to make confectionary products, especially sugarless hard boiled sweets or candies.

It is another object of the present invention to provide a stable hydrogenated starch hydrolysate having a high glass transition temperature.

It is still another object of the present invention to provide a stable hydrogenated starch hydrolysate syrup which has a reduced caloric content, good physical properties, good anticrystallizing power, and a viscosity which is not too high (e.g., about 11,000–16,500 cps).

These and other objects and advantages of the present invention can be appreciated by referring to the following description and claims or may be learned by the practice of this invention.

SUMMARY OF THE INVENTION

The present invention relates to hydrogenated starch hydrolysates which have a content of hydrogenated monosaccharides (DP=1) of less than 8 wt.-%, a content of hydrogenated dissaccharides (DP=2) of less than 41 wt.-%, a content of hydrogenated trisaccharides (DP=3) of less than 15 wt.-%, a content of hydrogenated oligosaccarides of hydrogenated quat- to deca-oligosaccharides (DP=4 to 10) of less than 30 wt.-%, and a content of hydrogenated polysaccharides of greater than hydrogenated decasaccharides (DP$\geq$11) of about 14 to about 38 wt.-%.

DESCRIPTION OF THE PREFERRED EMBODIMENTS

Reference will now be made in more detail to the preferred embodiments of the invention. The hydrogenated starch hydrolysate syrup according to the present invention produces hard boiled candies that are stable at high temperatures (e.g., 65.6° C.) and high water contents (e.g., 1–4% by weight), which candies absorb less water under humid conditions (e.g., 30%, 50% and 75% relative humidity at about 25° C.) than other hard boiled candies that are presently on the market (e.g., a sugar-free hard boiled candy made by Allen Wertz Candy Company, San Dimas, Calif., made from HYSTAR 3375 HSH syrup from Lonza). Advantageously, the present invention includes a mixture of a) a hydrogenated starch hydrolysate that has between 70 and 80 wt.-% total solids, preferably about 75 wt.-% total solids, such as a maltitol syrup like MALTISWEET™ 3145 (a product of SPI Polyols, Inc., New Castle, Del.), and b) a hydrogenated low DE maltodextrin or low DE corn syrup.

MALTISWEET™ 3145 is produced from the hydrogenation of a high maltose corn syrup having an approximate DE=55. The high maltose corn syrup contains at least 70 wt.-% maltose. A preferred high maltose corn syrup is CASCO™ 1538, a product of CASCO, which is a division of CPC, Inc., Cardinal, Ontario, Canada.

Preferable low DE maltodextrins which can be hydrogenated to form the hydrogenated low DE maltodextrin or low DE corn syrup that is used in the hydrogenated starch hydrolysate of the present invention include the following three (3) commercial products which are manufactured by Grain Processing Corp., Muscatine, Iowa:

1. Maltodextrin M 180 (approximate DE=18), having an average theoretical molecular weight of 1000 and an average DP=6.2.
2. Maltodextrin M 200 (approximate DE=20), having an average theoretical molecular weight of 900 and an average DP=5.6.
3. Maltodextrin M 250 (approximate DE=25), having an average theoretical molecular weight of 720 and an average DP=4.5.

The maltodextrins or corn syrup can be hydrogenated by conventional means, such as a hydrogenation process which employs a molybdenum (obtained from Davidson Chemical Company, a division of W.R. Grace, type 3110) promoted Raney nickel catalyst.

The preferred hydrogenated starch hydrolysate of the present invention contains the amounts of each kind of saccharide (differentiated by DPs) shown in Table 1. When about 30 to 70 wt. % of Maltisweet™ 3145 is mixed with about 70 to 30 wt.-% of hydrogenated M180, M200, M250, or a mixture thereof, the resulting hydrogenated starch hydrolysate syrup is within the range of Formula A in Table 1. The weight percents of the various saccharides in the hydrogenated starch hydrolysate syrups are based on the solids content in the syrups (i.e., they are not based on the total weight of the syrup; the weight of the water is excluded).

TABLE 1

DP Characterization by HPLC Analysis of Formulae A, B and C Hydrogenated Starch Hydrolysates

| DP | A wt-% of syrup | B Preferred wt-% of syrup | C Most Preferred wt-% of syrup |
|---|---|---|---|
| 1 + unknown | <8 | 2.6–7.7 | 2.8–3.7 |
| 2 | <41 | 21.4–40.1 | 25.8–34.3 |
| 3 | <15 | 8.9–13.6 | 10.4–12.2 |
| 4–10 | <30 | 16.0–29.3 | 24.5–29.3 |
| 11 or more | 14–38 | 22.5–37.1 | 22.5–29.2 |

When compared to hard boiled candies prepared from conventional hydrogenated starch hydrolysate syrups, the hard boiled candies formed from the hydrogenated starch hydrolysate syrups according to the present invention are significantly more stable at high temperatures (e.g., 65.6° C.) and high moisture contents (e.g., 1–4% by weight) and absorb less water when stored under humid conditions at ambient temperature for extended periods. The hard boiled candies produced from the hydrogenated starch hydrolysate syrups of the present invention having a high 5 wt.-% of the hydrogenated maltodextrin component (e.g., 50–70 wt.-%) exhibit the highest heat stability and lowest absorption of moisture when stored under humid conditions.

It was surprising that the hard boiled candies formed from the hydrogenated starch hydrolysate of the present invention were significantly more stable at high temperatures and high water contents than the hard boiled candies that are formed from the hydrogenated starch hydrolysate syrups that are presently on the market. Although applicants do not wish to be bound by any theory, it is believed that the increase in stability as well as the reduction in the amount of water absorbed can be attributed to the lower contents of DP=4 to 10 hydrogenated oligosaccharides, the lower contents of DP=1 hydrogenated monosaccharides, and/or the higher contents of DP$\geq$11 hydrogenated polysaccharides greater than decasaccharides in the hydrogenated starch hydrolysates of the present invention.

The glass transition temperature (Tg) of hard boiled sweets or candies is lowered by the addition of water to the candy (e.g., through absorption from the surrounding environment). The absorbed water can solubilize hydrogenated DP=1 to 3 saccharides. The hard boiled candies produced from the hydrogenated starch hydrolysate of the present invention contain relatively low amounts of hydrogenated DP=1 to 3 saccharides, which may contribute to a reduction in the absorption of moisture since these hydrogenated DP=1 to 3 saccharides are hygroscopic (especially sorbitol). Although applicants do not wish to be bound by any theory, it is believed that the hard boiled candies produced from the hydrogenated starch hydrolysates of the present invention demonstrate a reduced water absorption in part because they contain relatively low levels of the hydrogenated DP=1 monosaccharide, such as sorbitol. Furthermore, also present in the hydrogenated starch hydrolysate of the present invention is a relatively high amount of hydrogenated DP$\geq$11 polysaccharides, which have low water solubilities due to their high branching. The less soluble hydrogenated DP$\geq$11 polysaccharides may reduce the amount of water absorbed by the hard boiled candies under humid conditions. This reduces the likelihood of dissolving candies or 'cold flow' candies, which are sticky and sometimes deformable candies at ambient temperature. The higher hydrogenated DP$\geq$11 polysaccharides also contribute to higher glass transition temperatures ($T_g$), which is the temperature at which, upon heating, a glassy and solid boiled candy or sweet softens and eventually becomes a syrupy liquid. A higher glass transition temperature is a beneficial property in a boiled hard candy because the candy will be a stable glassy material (e.g., a hard candy) over a broader useful temperature range.

One drawback with relatively high percentages of hydrogenated maltodextrins in the hydrogenated starch hydrolysate is that they tend to increase the viscosity of the hydrogenated starch hydrolysate, probably due to the higher amounts of hydrogenated DP$\geq$11 polysaccharides. This is why the amount of hydrogenated maltodextrin in the hydrogenated starch hydrolysate is usually not greater than 70 wt.-%. In industry, the viscosities of cooked hydrogenated starch hydrolysate syrups are preferably about 11,000 to 12,800 cps at 165.6° C. (330° F.). However, through the use of special processing equipment of a type which would be known to one skilled in the art, it is possible to use hydrogenated starch hydrolysates which have higher viscosities.

The heat and moisture stability of hydrogenated starch hydrolysate hard boiled candy is dependent on the water content of the hard boiled candy and the water absorption under humid conditions at ambient temperature. When the water absorption rate of a hard boiled candy formed from a hydrogenated starch hydrolysate syrup under humid conditions at ambient temperature is high, the candy will partially dissolve or 'cold flow', which leads to sticky and sometimes deformable candies at ambient temperature, as described above. Moreover, a hydrogenated starch hydrolysate hard boiled candy that has a relatively high moisture content is more likely to melt at elevated temperatures during storage than a similar hydrogenated starch hydrolysate candy with a lower moisture content. This is because the glass transition temperature of the candy decreases as the water content of the candy increases. The hydrogenated starch hydrolysate hard boiled candies according to the present invention have higher glass transition temperatures, higher heat stabilities at high moisture contents (e.g., 1–4% by weight) and lower moisture absorption when stored under humid conditions for extended periods than the commercial hydrogenated starch hydrolysate hard boiled candies that are presently on the market.

The method of making the hydrogenated starch hydrolysate syrups according to the present invention involves blending MALTISWEET™ 3145 with various types of hydrogenated low DE maltodextrins or low DE corn syrups, for example, M180, M200 and M250, as described above. The blend of MALTISWEET™ 3145 and hydrogenated low DE maltodextrins or low DE corn syrups is heated to a temperature of about 171° C., without pulling a vacuum. Once the blend reaches 171° C., it is poured onto a surface to cool. The blend at this point is molten and highly viscous (e.g., between about 11,000 and 16,000 cps) and is spread or scraped on the cooling surface to a thickness of about 0.5 to 1.0 inch. The molten blend is gradually cooled at ambient room temperature to a temperature of about 93–95° C. at which time the cooled blend is shaped into the final candy shape. If desired, secondary ingredients such as flavorants, colorings or active ingredients can be added to either the molten blend or the cooled blend (i.e., at about 93–95° C.) before the final shaping step. The degree of polymerization (DP) of the final HSH syrup is determined by HPLC.

Table 2 below shows the breakdown (i.e., in weight percent based on the solids content of the HSH syrup) of the components in the preferred HSH syrups of the present invention (labeled as Formulae D, E and F) which components are identified by their DP numbers. Table 2 also shows the breakdown for two commercial products (labeled as Formulae X and Y) that are presently on the market.

TABLE 2

DP Characterization by HPLC Analysis of Formulae D, E and F and Comparative Examples X and Y

| DP | D 50/50 hydrogenated M180/Maltisweet ™ 3145 wt.-% | E 50/50 hydrogenated M200/Maltisweet ™ 3145 wt.-% | F 70/30 hydrogenated M250/Maltisweet ™ 3145 wt.-% | X wt.-% | Y wt.-% |
|---|---|---|---|---|---|
| DP = 1 | 2.89 | 3.2 | 7.65 | 14.32 | 13.44 |
| DP = 2 | 32.91 | 34.26 | 25.82 | 19.3 | 9.71 |
| DP = 3 | 10.55 | 12.17 | 10.42 | 12.07 | 9.14 |
| DP = 4 to 10 | 24.5 | 27.84 | 29.22 | 37.36 | 40.55 |
| DP ≥ 11 | 29.18 | 22.54 | 26.9 | 16.96 | 26.84 |

Each blend of hydrogenated maltodextrin with MALTISWEET™ 3145 (D, E or F) provided a hydrogenated starch hydrolysate syrup which produced a hard boiled candy that had a higher heat stability (e.g., at higher water contents) and absorbed less amounts of water when stored under humid conditions at 25° C. when compared to hard boiled candies produced from commercial products (X and Y). Water absorption of the hydrogenated starch hydrolysate hard boiled candy was tested in 30%, 50% and 75% relative humidity chambers at 25° C.

It is preferred to use the hydrogenated M180 (i.e., as the hydrogenated low DE maltodextrin) in the hydrogenated starch hydrolysate mixture because of its lower amounts of reducing sugars and dextrose. Moreover, the hydrogenated starch hydrolysate according to the present invention can also be blended with a crystallizable polyol, such as lactitol, isomalt, maltitol, mannitol, erythritol, sorbitol, xylitol or polydextrose at various ratios and still provide hard boiled candies that have high stabilities at elevated temperature and water contents (e.g., 1–4% by weight water) and lower water absorption when stored under humid conditions for extended periods. However, one of the advantages provided by the present invention is that there is no need to add a crystallizable polyol. The hydrogenated starch hydrolysate according to the present invention contains only non-crystallizable polyol forms, which avoids any turning (crystallization from the surface to the center of the sweet) or graining (crystallization from the center to the surface of the sweet) problems and promotes an attractive glassy appearance.

The hard boiled candies formed from the hydrogenated starch hydrolysates according to the present invention also exhibit higher glass transition temperatures than hard boiled candies formed from conventional hydrogenated starch hydrolysates. For example, six hard boiled candies formed from hydrogenated starch hydrolysates according to the present invention with various compositions were tested to determine their glass transition temperatures. The results of those tests are summarized in Table 3. All six samples fell within the formula A set forth in Table 1. Three of the samples fell within the formula B set forth in Table 1 and two of the samples fell within the formula C set forth in Table 1. It should be noted that the ranges for the various glass transition temperatures set forth in Table 3 should be considered as exemplary ranges and not as limiting ranges because the six samples tested did not completely cover the possible compositional ranges of formulae A, B and C (i.e., the lowest and highest amounts for each component were not tested). However, from the data obtained from the six samples that were tested, it can be determined that the hard boiled candies produced from the hydrogenated starch hydrolysate of the present invention will have an onset glass transition temperature of at least about 49° C., a mid-point glass transition temperature of at least about 51° C. and a final point glass transition temperature of at least about 54° C. The hard boiled candies produced from the preferred hydrogenated starch hydrolysates of the present invention have onset glass transition temperatures that are at least 55° C., preferably at least 59° C., most preferably at least 67° C.; midpoint glass transition temperatures that are at least 59° C., preferably at least 64° C., most preferably at least 70° C.; and final point glass transition temperatures that are at least 67° C., preferably at least 74° C., most preferably at least 78° C. All of the various glass transition temperatures of the six samples that were tested were measured using hard boiled candy samples that had a water content of from 1–2wt. %.

TABLE 3

Glass Transition Temperature (Tg) Profile

| Sample | @ onset Tg (° C.) | @ midpoint Tg (° C.) | @ final point Tg (° C.) |
|---|---|---|---|
| Formula A | 49.1–67.8 | 51.4–85.7 | 54.4–91.4 |
| Formula B | 55.0–67.8 | 58.9–70.2 | 67.2–77.8 |
| Formula C | 58.6–63.6 | 64.4–65.1 | 73.8–74.1 |

The higher glass transition temperatures of the hard boiled candies that are produced from the hydrogenated starch hydrolysates of the present invention result in candies that are stable at higher temperatures. Further, since the hard boiled candies of the present invention have a higher glass transition temperature at a given water content (i.e., the water content in the candy) than the hard boiled HSH candies that are presently on the market, the hard boiled candies of the present invention will maintain their stability at normal ambient room temperature at a significantly higher water content than the hard boiled HSH candies that are presently on the market.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. Hydrogenated starch hydrolysate, comprising
   A. a content of hydrogenated monosaccharides (DP=1) of less than 8 wt.-%;
   B. a content of hydrogenated dissaccharides (DP=2) of less than 41 wt.-%;

C. a content of hydrogenated trisaccharides (DP=3) of less than 15 wt.-%;

D. a content of hydrogenated oligosaccharides of hydrogenated quat- to deca-saccharides (DP=4 to 10) of less than 30 wt.-%; and E. a content of hydrogenated polysaccharides of greater than hydrogenated decasaccharides (DP≧11) of about 14 to about 38 wt.-%.

2. The hydrogenated starch hydrolysate according to claim 1, wherein the content of hydrogenated oligosaccharides of DP=4 to DP=10 is about 16.0 to about 29.3 wt.-%.

3. The hydrogenated starch hydrolysate according to claim 1, wherein the content of hydrogenated monosaccharides of DP=1 is about 2.6 to about 7.7 wt.-%.

4. The hydrogenated starch hydrolysate to claim 3, wherein the content of hydrogenated monosaccharides of DP=1 is about 2.8 to about 3.7 wt.-%.

5. The hydrogenated starch hydrolysate according to claim 1, wherein the content of hydrogenated polysaccharides of DP≧11 is about 22.5 to about 37.1 wt.-%.

6. The hydrogenated starch hydrolysate according to claim 1, wherein the content of components A to E is as follows:

A. from about 2.6 to about 7.7 wt.-% of said hydrogenated monosaccharides (DP=1);

B. from about 21.4 to about 40.1 wt.-% of said hydrogenated disaccharides (DP=2);

C. from about 8.9 to about 13.6 wt.-% of said hydrogenated trisaccharides (DP=3);

D. from about 16.0 to about 29.3 wt.-% of said hydrogenated oligosaccharides (DP=4 to 10); and E. from about 22.5 to about 37.1 wt.-% of said hydrogenated polysaccharides of greater than hydrogenated decasaccharides (DP≧11).

7. The hydrogenated starch hydrolysate according to claim 6, wherein the content of components A to E is as follows:

A. from about 2.8 to about 3.7 wt.-% of said hydrogenated monosaccharides (DP=1);

B. from about 25.8 to about 34.3 wt.-% of said hydrogenated disaccharides (DP=2);

C. from about 10.4 to about 12.2 wt.-% of said hydrogenated trisaccharides (DP=3);

D. from about 24.5 to about 29.3 wt.-% of said hydrogenated oligosaccharides (DP=4 to 10); and E. from about 22.5 to about 29.2 wt.-% of said hydrogenated polysaccharides of greater than hydrogenated decasaccharides (DP≧11).

8. The hydrogenated starch hydrolysate according to claim 1, wherein the hydrogenated starch hydrolysate has a final point glass transition temperature of from about 67° C.

9. Sugarless hard boiled candy comprising the hydrogenated starch hydrolysate according to claim 1.

10. The sugarless hard boiled candy according to claim 9, further comprising at least one crystallizable polyol.

* * * * *

UNITED STATES PATENT AND TRADEMARK OFFICE
CERTIFICATE OF CORRECTION

PATENT NO.   : 6,780,990 B1
DATED        : August 24, 2004
INVENTOR(S)  : Anh S. Le It is certified that error appears in the above-identified patent and that said Letters Patent is hereby corrected as shown below:

<u>Title page,</u>
Item [56], References Cited, OTHER PUBLICATIONS, "Glass Transition Explanation for the Effect of Polyhydroxy Compoounds on Protein Denaturation in Dehdrated Solids, Leonard N. Bell et al., "Journal of Food Service," vol. 61, No. 2, 1996, pp. 372-374." should read -- Glass Transition Explanation for the Effect of Polyhydroxy Compounds on Protein Denaturation in Dehydrated Solids, Leonard N. Bell et al., "Journal of Food Science," vol. 61, No. 2, 1996, pp. 372-374. --.

<u>Column 8, line 63 to Column 10, line 28,</u>
Replace claims 1-10 with the following new set of claims 1-10:

1. Powder particles comprising malic acid or a mixture of acidulants encapsulated within a coating of hydrogenated maltodextrin.

2. The powder particles of claim 1, wherein said maltodextrin has a DE value of from about 4-25.

3. The powder particles of claim 1 wherein said powder particles consist essentially of about 0.1-40 percent by weight of at least one acid selected from the group consisting of malic acid, citric acid, tartaric acid, fumaric acid, adipic acid, lactic acid, phosphoric acid, ascorbic acid, succinic acid and hydroxyacetic acid with the remainder to 100% by weight being the coating.

4. Powder particles comprising malic acid or a mixture of acidulants encapsulated within a coating comprising a hydrogenated maltodextrin and at least one crystallizable polyol selected from the group consisting of lactitol, isomalt, maltitol, mannitol, erythritol, sorbitol, xylitol and polydextrose.

5. The powder particle of claim 4, wherein the coating contains from 0.01% to 50% by weight of the crystallizable polyol.

6. Powder particles comprising a flavorant encapsulated within a coating comprising hydrogenated maltodextrin.

7. Powder particles according to claim 6, wherein said coating additionally comprises at least one crystallizable polyol selected from the group consisting of lactitol, isomalt, maltitol, mannitol, erythritol, sorbitol, xylitol and polydextrose.

UNITED STATES PATENT AND TRADEMARK OFFICE
CERTIFICATE OF CORRECTION

PATENT NO. : 6,780,990 B1
DATED : August 24, 2004
INVENTOR(S) : Anh S. Le

It is certified that error appears in the above-identified patent and that said Letters Patent is hereby corrected as shown below:

<u>Column 8, line 63 to Column 10, line 28 (cont'd),</u>

8. The powder particles of claim 6, wherein said maltodextrin has a DE value of from about 4-25.

9. The powder particles of claim 1, wherein said maltodextrin is a corn syrup having a DE value of from about 4-25.

10. The powder particles of claim 6, wherein said maltodextrin has a DE value of from about 4-25.

Signed and Sealed this

Fifteenth Day of November, 2005

JON W. DUDAS
*Director of the United States Patent and Trademark Office*